United States Patent
Okumura

(10) Patent No.: US 12,378,428 B2
(45) Date of Patent: Aug. 5, 2025

(54) WATER-BASED INK FOR INK-JET RECORDING

(71) Applicant: BROTHER KOGYO KABUSHIKI KAISHA, Nagoya (JP)

(72) Inventor: Yuki Okumura, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 753 days.

(21) Appl. No.: 17/524,278

(22) Filed: Nov. 11, 2021

(65) Prior Publication Data

US 2022/0119661 A1    Apr. 21, 2022

Related U.S. Application Data

(63) Continuation of application No. PCT/JP2020/018542, filed on May 7, 2020.

(30) Foreign Application Priority Data

May 31, 2019    (JP) .................... 2019-102064

(51) Int. Cl.
| | |
|---|---|
| C09D 11/326 | (2014.01) |
| B41M 5/00 | (2006.01) |
| C09D 11/107 | (2014.01) |
| C09D 11/38 | (2014.01) |

(52) U.S. Cl.
CPC .......... C09D 11/326 (2013.01); C09D 11/107 (2013.01); C09D 11/38 (2013.01); *B41M 5/0023* (2013.01)

(58) Field of Classification Search
CPC .................................................. C09D 11/326
See application file for complete search history.

(56) References Cited

U.S. PATENT DOCUMENTS 6,770,689 B1 * 8/2004 Yoshimura ............ C09D 11/16
                                                        106/404
2004/0186200 A1   9/2004 Yatake
(Continued)

FOREIGN PATENT DOCUMENTS

| EP | 1 111 018 A1 | 6/2001 |
| JP | 3-197143 A | 8/1991 |

(Continued)

OTHER PUBLICATIONS

International Preliminary Report on Patenatibility and Written Opinion of the International Searching Authority issued in corresponding International Patent Application No. PCT/JP2020/018542, dated Nov. 16, 2021.
(Continued)

*Primary Examiner* — Michael F Pepitone
(74) *Attorney, Agent, or Firm* — Merchant & Gould P.C.

(57) ABSTRACT

A water-based ink for ink-jet recording includes: a resin-dispersed pigment; resin fine particles of which glass transition temperature is not less than 22° C.; a humectant including a humectant component of which vapor pressure at 20° C. is not less than 0.02 hPa; and water. The water-based ink satisfies the following conditions (A) and (B): condition (A): $8.8 \leq \beta/\alpha \leq 18.6$, condition (B): $2.4 \leq \beta/\gamma \leq 3.5$; in the conditions (A) and (B): $\alpha$: a viscosity (mPa·s) at 25° C. of the water-based ink in a case that an evaporation rate obtained by a formula (1) is 0%, $\beta$: a viscosity (mPa·s) at 25° C. of the water-based ink in a case that the evaporation rate obtained by the formula (1) is 50%, and $\gamma$: a viscosity (mPa·s) at 25° C. of the water-based ink in a case that the evaporation rate obtained by the formula (1) is 40%.

7 Claims, 1 Drawing Sheet

(56) References Cited

U.S. PATENT DOCUMENTS

| | | | |
|---|---|---|---|
| 2014/0015895 A1* | 1/2014 | Okamura | B41J 2/17503 |
| | | | 347/100 |
| 2018/0142110 A1 | 5/2018 | Maeda | |
| 2019/0092954 A1 | 3/2019 | Nishiura et al. | |
| 2022/0315780 A1* | 10/2022 | Okumura | C09D 11/322 |

FOREIGN PATENT DOCUMENTS

| | | |
|---|---|---|
| JP | 9-111166 A | 4/1997 |
| JP | 2002-52804 A | 2/2002 |
| JP | 2004-123906 A | 4/2004 |
| JP | 2010-47727 A | 3/2010 |
| JP | 2015-127767 A | 7/2015 |
| JP | 2017-7293 A | 1/2017 |
| JP | 2018-80255 A | 5/2018 |
| JP | 2019-59844 A | 4/2019 |
| WO | 2016-181797 A1 | 11/2016 |

OTHER PUBLICATIONS

International Search Report issued in corresponding International Patent Application No. PCT/JP2020/018542, mailed Jul. 21, 2020, 7 pages.

Office Action (Notice of Reasons for Refusal) issued in corresponding Japanese Patent Application No. 2019-102064, Feb. 7, 2023.

Extended European Search Report issued in corresponding European Patent Application No. 20814179.6, Jun. 12, 2023.

* cited by examiner

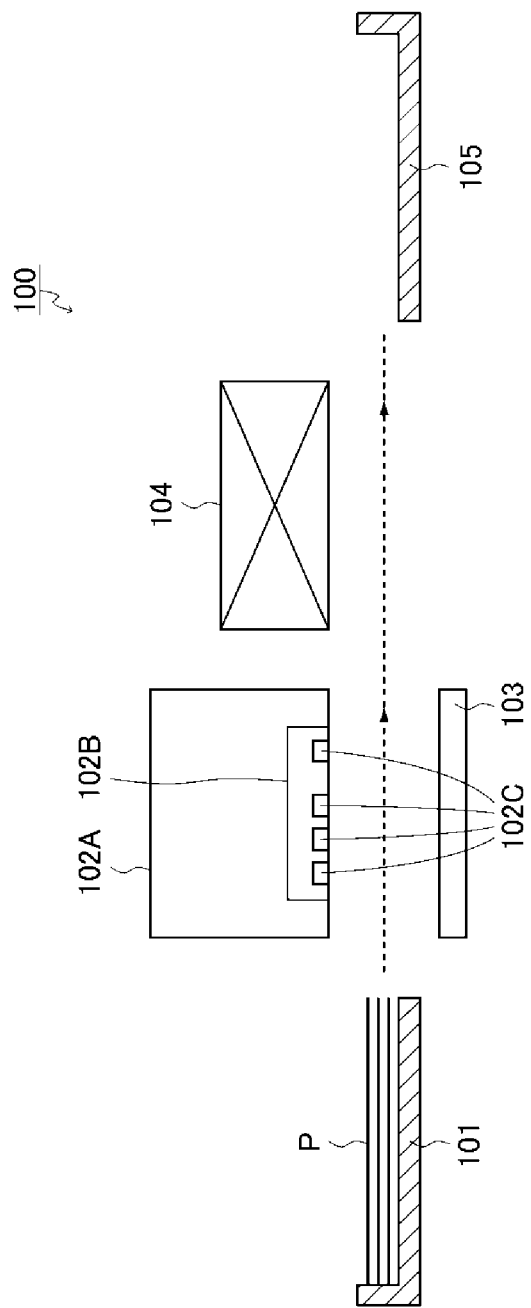

WATER-BASED INK FOR INK-JET RECORDING

CROSS REFERENCE TO RELATED APPLICATIONS

This application is a Continuation Application of International Application No. PCT/JP2020/018542 which was filed on May 7, 2020 claiming the conventional priority of Japanese patent Application No. 2019-102064 filed on May 31, 2019. The disclosures of Japanese patent Application No. 2019-102064 and International Application No. PCT/JP2020/018542 are incorporated herein by reference in their entirety.

BACKGROUND

The present disclosure relates to a water-based ink for ink-jet recording.

In a recorded matter by the ink-jet recording, usage of a pressing means, such as a roller, etc., is suggested as a method of improving the fixing property.

SUMMARY

However, a pressing processing, by the pressing means, with respect to the recording medium after discharge of the ink makes a step of the ink-jet recording to be complex.

In view of this, an object of the present disclosure is to provide a water-based ink for ink-jet recording capable of improving the fixing property of the water-based ink for ink-jet recording with respect to the recording medium, without requiring any complex configuration.

According to the present disclosure, there is provided a water-based ink for ink-jet recording including:
a resin-dispersed pigment;
resin fine particles of which glass transition temperature is not less than 22° C.;
a humectant including a humectant component of which vapor pressure at 20° C. is not less than 0.02 hPa; and
water,
wherein the resin fine particles are formed of a resin which is at least one selected from a group consisting of: a resin based on acrylic acid, a resin based on maleate ester, a resin based on vinyl acetate, a resin based on carbonate, a resin based on styrene, a resin based on ethylene, a resin based on propylene, a resin based on urethane, and a resin of copolymer of those listed above; and
the water-based ink satisfies the following conditions (A) and (B):

$8.8 \leq \beta/\alpha \leq 18.6$        condition (A):

$2.4 \leq \beta/\gamma \leq 3.5$        condition (B):

in the conditions (A) and (B),
α: a viscosity (mPa·s) at 25° C. of the water-based ink in a case that an evaporation rate, of the water-based ink, obtained by the following formula (1) is 0%,
β: a viscosity (mPa·s) at 25° C. of the water-based ink in a case that the evaporation rate, of the water-based ink, obtained by the following formula (1) is 50%, and
γ: a viscosity (mPa·s) at 25° C. of the water-based ink in a case that the evaporation rate, of the water-based ink, obtained by the following formula (1) is 40%;

Evaporation rate(%)={(a mass of the water-based ink before evaporation)−(a mass of the water-based ink after the evaporation)}/(the mass of the water-based ink before the evaporation)×100     (1).

BRIEF DESCRIPTION OF THE DRAWINGS

FIG. 1 is a schematic view of an example of the configuration of an ink-jet recording apparatus of the present disclosure.

DETAILED DESCRIPTION

A water-based ink for ink-jet recording of the present disclosure will be explained. The water-based ink of the present disclosure includes a resin-dispersed pigment (resin-dispersible pigment, resin dispersion type pigment), resin fine particles, a humectant and water.

The resin-dispersed pigment is dispersible in water by, for example, a resin for dispersing pigment (resin dispersant). The resin-dispersed pigment is not particularly limited, and is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, inorganic pigments based on iron oxide, inorganic pigments based on carbon black, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; dye lake pigments such as basic dye type lake pigment, acid dye type lake pigment etc.; nitro pigment; nitroso pigment; aniline black daylight fluorescent pigment; and the like. Examples of resin-dispersed pigments other than those described above are exemplified, for example, by C. I. Pigment Blacks 1, 6, and 7; C. I. Pigment Yellows 1, 2, 3, 12, 13, 14, 15, 16, 17, 55, 74, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; and a solid solution of any one of the above-described pigments; etc.

As the resin dispersant, it is allowable to use, for example, a resin dispersant including at least one of methacrylic acid and acrylic acid as a monomer; it is allowable to use, as the resin dispersant, for example, a commercially available product. The resin dispersant may further include, as the monomer, for example, styrene, vinyl chloride, etc. The commercially available product is exemplified, for example, by "JOHNCRYL (trade name) 611" (weight average molecular weight: 8100, acid value: 53 mgKOH/g), "JOHNCRYL (trade name) 60" (weight average molecular weight: 8500, acid value: 215 mgKOH/g), "JOHNCRYL (trade name) 586", "JOHNCRYL (trade name) 687", "JOHNCRYL (trade name) 63", and "JOHNCRYL (trade name) HPD296" produced by BASF CORPORATION (the former JOHNSON POLYMER L.L.C.); "Disperbyk (trade name) 190" and "Disperbyk (trade name) 191" produced by BYK ADDITIVES & INSTRUMENTS; "SOLSPERSE (trade name) 20000" and "SOLSPERSE (trade name) 27000" produced by ZENECA; and the like.

A solid content amount of the resin-dispersed pigment (pigment solid component amount (P)) in the entire amount of the water-based ink is not particularly limited, and may be appropriately determined in accordance with, for example, a desired optical density or chromaticness, etc. The pigment solid component amount (P) is, for example, in a range of 0.1% by mass to 20% by mass, in a range of 1% by mass to 15% by mass, or in a range of 2% by mass to 10% by mass. The pigment solid component amount (P) is the mass only of the pigment, and does not include the mass of the resin dispersant. One kind of the resin-dispersed pigment may be used singly, or two or more kinds of the resin-dispersed pigment may be used in combination.

It is allowable that the water-based ink further contains a pigment and a dye, etc., which are different from the resin-dispersed pigment, in addition to the resin-dispersed pigment, or that the water-based ink does not further contain a pigment and a dye, etc., which are different from the resin-dispersed pigment. The colorant contained in the water-based ink may be only the resin-dispersed pigment.

The glass transition temperature (Tg) of the resin fine particles is not less than 22° C. The Tg of the resin fine particles may be, for example, in a range of not less than 22° C. to not more than 71° C. (in a range of 22° C. to 71° C.), or in a range of not less than 40° C. to not more than 71° C. (in a range of 40° C. to 71° C.). By using resin fine particles of which Tg is not less than 40° C., it is possible to obtain a water-based ink which has a further excellent fixing property to the recording medium. The resin fine particles may be, for example, those included in a resin emulsion. The resin emulsion is composed, for example, of the resin fine particles and a dispersion medium (for example, water, etc.), wherein the resin fine particles are dispersed with respect to the dispersion medium with a specific particle diameter, not being in a dissolved state. The resin fine particles included in the resin emulsion are exemplified, for example, by resin fine particles which are formed of: a resin based on acrylic acid, a resin based on maleate ester, a resin based on vinyl acetate, a resin based on carbonate, a resin based on styrene, a resin based on ethylene, a resin based on propylene, a resin based on urethane, and a resin of copolymer of the above-described resins, etc.

As the resin emulsion, for example, a commercially available product of resin emulsion may be used. The commercially available product of the resin emulsion is exemplified, for example, by "MOWINYL (trade name) 6969D" (emulsion based on isomeric acrylate copolymer, average particle diameter: 149 nm, Tg: 71° C.), "MOWINYL (trade name) 5450" (emulsion based on isomeric styrene/acrylate copolymer, average particle diameter: 68 nm, Tg: 53° C.), "MOWINYL (trade name) DM772" (Tg: 22° C.) manufactured by JAPAN COATING RESIN CO., LTD.; "SUPERFLEX (trade name) 150" (resin emulsion based on urethane, average particle diameter: 30 nm, Tg: 40° C.), manufactured by DKS CO., LTD (DAI-ICHI KOGYO SEIYAKU CO., LTD); and the like.

The average particle diameter of the resin fine particles is, for example, in a range of 30 nm to 200 nm. The average particle diameter of the resin fine particles can be calculated as an arithmetic average diameter, for example, by using a dynamic light scattering particle diameter distribution measuring apparatus "LB-550" manufactured by HORIBA, LTD. The average particle diameter may be an average particle diameter (intensity average particle diameter) calculated from the particle diameter distribution based on the intensity (particle diameter distribution based on the light scattering intensity).

The content amount (R) of the resin fine particles in the entire amount of the water-based ink is, for example, in a range of 0.1% by mass to 30% by mass, in a range of 0.5% by mass to 20% by mass, or in a range of 1% by mass to 10% by mass. One kind of the resin fine particles may be used singly, or two or more kinds of the resin fine particles may be used in combination.

The humectant prevents, for example, the ink from drying at an end part of a nozzle in an ink-jet head. The humectant includes a humectant of which vapor pressure at 20° C. is not less than 0.02 hPa (a humectant component of which vapor pressure at 20° C. is not less than 0.02 hPa) (hereinafter referred to as a "specific humectant"). The specific humectant is exemplified, for example, by alkylene glycol such as propylene glycol (vapor pressure at 20° C.: 0.11 hPa), diethylene glycol (vapor pressure at 20° C.: 0.03 hPa), etc., and the propylene glycol is preferred. In a case that the specific humectant is the propylene glycol, it is possible to obtain a water-based ink which has a further excellent fixing property to the recording medium. The upper limit value of the vapor pressure at 20° C. of the specific humectant is, for example, not more than 6 hPa, not more than 1 hPa, or not more than 0.2 hPa. In a case that the vapor pressure at 20° C. exceeds the upper limit value, there is such a fear that the original function as the humectant (suppression of the drying of the ink at the end part of the nozzle) might be lowered.

A content amount (H) of the specific humectant in the entire amount of the water-based ink is, for example, in a range of 1% by mass to 50% by mass, in a range of 5% by mass to 40% by mass, or in a range of 7.5% by mass to 36% by mass. One kind of the specific humectant may be used singly, or two or more kinds of the specific humectant may be used in combination.

It is preferred that a ratio (H/R) of the content amount (H: % by mass) of the specific humectant to the content amount (R: % by mass) of the resin fine particles in the entire amount of the water-based ink is not less than 2.9 (H/R≥2.9). In a case that the ratio (H/R) is made to be not less than 2.9 (H/R≤2.9), it is possible to obtain a water-based ink which has a further excellent fixing property to the recording medium. Further, similarly, from a viewpoint of improving the fixing property to the recording medium, the ratio H/R is, for example, not more than 6.0.

It is allowable that the humectant further contains a humectant which is different from the specific humectant, or that the humectant does not further contain a humectant which is different from the specific humectant. The humectant contained in the water-based ink may be only the specific humectant. The humectant which is different from the specific humectant is not particularly limited, and is exemplified, for example, by: glycerol, triethylene glycol, butylene glycol, dipropylene glycol, tripropylene glycol, thiodiglycol, trimethylol propane, trimethylol ethane, polyethylene glycol, polypropylene glycol, etc. One kind of the humectant may be used singly, or two or more kinds of the humectant may be used in combination.

The mass ratio of the specific humectant occupying in the entire amount of the humectant is, for example, not less than 60%, not less than 90%, or 100%.

The water-based ink may further include a water-soluble organic solvent which is different from the humectant. The water-soluble organic solvent which is different from the humectant is exemplified, for example, by a penetrant which adjusts the drying velocity on the recording medium.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or two or more kinds of the penetrant may be used in combination.

The content amount of the penetrant in the entire amount of the water-based ink is, for example, in a range of 0% by mass to 20% by mass, in a range of 0% by mass to 15% by mass, or in a range of 1% by mass to 6% by mass.

The water is preferably ion-exchange water or purified water (pure water). A content amount (W) of the water in the entire amount of the water-based ink is, for example, in a range of 10% by mass to 90% by mass or in a range of 20% by mass to 80% by mass. The content amount (W) of the water may be, for example, a balance of the other components.

A mass ratio (H/W) of the content amount (H) of the specific humectant to the content amount (W) of the water in the entire amount of the water-based ink is, for example, in a range of H/W=0.01 to 10, in a range of H/W=0.02 to 5, or in a range of H/W=0.03 to 1.

It is preferred that the water-based ink further satisfies the following condition (X), condition (Y) and condition (Z):

$$3 \leq R \leq 10 \quad \text{condition (X):}$$

$$0.7 \leq P/R \leq 1 \quad \text{condition (Y):}$$

$$W \geq 50, \quad \text{condition (Z):}$$

in the conditions (X), (Y) and (Z),
P: a solid content amount (% by mass) of the resin-dispersed pigment in the entire amount of the water-based ink,
R: a content amount (% by mass) of the resin fine particles in the entire amount of the water-based ink, and
W: a content amount (% by mass) of the water in the entire amount of the water-based ink.

Regarding the condition (X), in a case that the content amount (R) of the resin fine particles in the entire amount of the water-based ink is less than the above-described range, there is such a fear that a resin film in an image recorded by the water-based ink might become to be thin, which in turn might lower the film strength (fixing property); on the other hand, in a case that the content amount (R) exceeds the above-described range, there is such a fear that the dispersion state of the water-based ink might become unstable. Regarding the condition (Y), in a case that the ratio (P/R) of the solid content amount (P) of the resin-dispersed pigment to the content amount (R) of the resin fine particles in the entire amount of the water-based ink is less than the above-described range, there is such a fear that the quality (density) of the image recorded by the water-based ink might be lowered and/or that the dispersion state of the water-based ink might become unstable; on the other hand, in a case that the ratio (P/R) exceeds the above-described range, since the amount of the resin fine particles, which function as the fixing agent with respect to the pigment becomes small, which in turn might lead to such a fear that the film strength (fixing property) might be lowered. Further, regarding the condition (Z), in a case that the content amount (W) of the water in the entire amount of the water-based ink is less than the above-described range, there is such a fear that the dispersion state of the water-based ink might become unstable, and/or that the ratio of the solvent of which vapor pressure is lower than that of the water might become relatively large, which in turn might lower the drying speed (fixing speed) of the water-based ink.

The water-based ink may further include a conventionally known additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The water-based ink can be prepared, for example, by uniformly mixing the resin-dispersed pigment, the resin fine particles, the specific humectant and the water, and an optionally other additive(s) as necessary, by a conventionally known method, and then removing any non-dissolved matter with a filter, etc.

The water-based ink satisfies the following conditions (A) and (B), $$8.8 \leq \beta/\alpha \leq 18.6 \quad \text{condition (A):}$$

$$2.4 \leq \beta/\gamma \leq 3.5, \quad \text{condition (B):}$$

in the conditions (A) and (B),
α: a viscosity (mPa·s) at 25° C. of the water-based ink in a case that an evaporation rate, of the water-based ink, obtained by the following formula (1) is 0%,
β: a viscosity (mPa·s) at 25° C. of the water-based ink in a case that the evaporation rate, of the water-based ink, obtained by the following formula (1) is 50%, and
γ: a viscosity (mPa·s) at 25° C. of the water-based ink in a case that the evaporation rate, of the water-based ink, obtained by the following formula (1) is 40%;

Evaporation rate(%)={(a mass of the water-based ink before evaporation)−(a mass of the water-based ink after the evaporation)}/(the mass of the water-based ink before the evaporation)×100     (1).

The evaporation rate can be measured, for example, as follows. Namely, 5 g of the water-based ink is weighed and placed in a glass jar of which volume is 24 mL and of which inner diameter is 20.2 mm. The glass jar in an opened state is made to stand still in a thermostatic bath of which temperature is 60° C. and relative humidity is 40%, for a predetermined period of time. After the elapse of the predetermined period of time, the mass of the water-based ink is measured, and the evaporation rate is calculated by the formula (1) from the difference in the mass before and after the predetermined period of time.

As described above, in the water-based ink of the present disclosure, the viscosity in the case that the evaporation rate is 0%, the viscosity in the case that the evaporation rate is 40% and the viscosity in the case that the evaporation rate is 50% satisfy the above-described conditions (A) and (B), and the water-based ink includes the resin fine particles of which glass transition temperature (Tg) is not less than 22° C., thereby making it possible to improve the fixing property to the recording medium, without requiring any complex configuration. This mechanism is presumed, for example, as follows. Namely, the water-based ink evaporates gradually during a period of time since the discharge or ejection thereof by the ink discharging mechanism until the landing thereof on a surface of the recording medium; according to the confirmation made by the inventor of the present disclosure, the evaporation rate at the time of landing on the surface of the recording medium is approximately 40%. Afterwards, in a case that the water-based ink becomes to be highly viscous (the viscosity of the water-based ink is greatly increased) until the evaporation rate becomes to be 50% (corresponding to a time of starting the formation of the resin film), the water-based ink forms a resin film which is highly bulky, which in turn makes the height among the ink droplets to be non-uniform, thereby lowering the fixing property. On the other hand, in a case that the water-based ink becomes hardly viscous (the viscosity of the water-based ink is hardly increased) during the period of time until the evaporation rate becomes to be 50%, the water-based ink, after having landed on the surface of the recording medium, wets and spreads on the surface of the recording medium, thereby making the thickness of the film to be formed to be thin, thus lowering the strength of the film. With respect to these points, it is presumed that the water-based ink of the present disclosure satisfies the condition (A) and the condition (B), thereby becoming to be viscous appropriately during the period of time until the evaporation rate becomes to be 50% and thus improving the fixing property to the recording medium. Further, in a case that the Tg of the resin fine particles is too low, the strength of the film is lowered. It is presumed, however, that the water-based ink of the present disclosure includes the resin fine particles of which Tg is not less than 22° C., thus making the strength of the film to be appropriately strong. Note that, however, this mechanism is merely a presumption, and the present disclosure is not limited to or restricted by this.

The viscosities $\alpha$, $\beta$ and $\gamma$ may be appropriately adjusted so as to satisfy the condition (A) and the condition (B). The upper limit value of the viscosity $\alpha$ is, for example, not more than 15 mPa·s, not more than 10.1 mPa·s or not more than 7.9 mPa·s. The lower limit value of the viscosity $\alpha$ is, for example, not less than 2 mPa·s, not less than 2.5 mPa·s or not less than 3 mPa·s. The viscosity $\beta$ is, for example, in a range of 15 mPa·s to 300 mPa·s, in a range of 20 mPa·s to 250 mPa·s or in a range of 25 mPa·s to 200 mPa·s. The viscosity $\gamma$ is, for example, in a range of 5 mPa·s to 120 mPa·s, in a range of 7 mPa·s to 100 mPa·s or in a range of 9 mPa·s to 90 mPa·s.

It is preferred that the water-based ink of the present disclosure further satisfies the following condition (B1). In a case that the water-based ink of the present disclosure satisfies the following condition (B1), it is possible to obtain a water-based ink which has a further excellent fixing property to the recording medium.

$$2.5 \leq \beta/\gamma \leq 3.2, \quad \text{Condition (B1):}$$

in the condition (B1), $\beta$: the viscosity (mPa·s) at 25° C. of the water-based ink in a case that the evaporation rate, of the water-based ink, obtained by the formula (1) is 50%, and $\gamma$: the viscosity (mPa·s) at 25° C. of the water-based ink in a case that the evaporation rate, of the water-based ink, obtained by the formula (1) is 40%.

It is preferred that the water-based ink of the present disclosure further satisfies the following condition (A1). In a case that the water-based ink of the present disclosure satisfies the following condition (A1), it is possible to obtain a water-based ink which has a further excellent fixing property to the recording medium.

$$8.8 \leq \beta/\alpha \leq 17.8 \quad \text{Condition (A1):}$$

in the condition (A1), $\alpha$: the viscosity (mPa·s) at 25° C. of the water-based ink in a case that an evaporation rate, of the water-based ink, obtained by the formula (1) is 0%, and $\beta$: the viscosity (mPa·s) at 25° C. of the water-based ink in a case that the evaporation rate, of the water-based ink, obtained by the formula (1) is 50%.

As described above, in the water-based ink for ink-jet recording of the present disclosure, the viscosity in the case that the evaporation rate is 0%, the viscosity in the case that the evaporation rate is 40% and the viscosity in the case that the evaporation rate is 50% satisfy the above-described conditions (A) and (B), and the water-based ink includes the resin fine particles of which glass transition temperature (Tg) is not less than 22° C. and which are formed of a resin which is at least one selected from the group consisting of: a resin based on acrylic acid, a resin based on maleate ester, a resin based on vinyl acetate, a resin based on carbonate, a resin based on styrene, a resin based on ethylene, a resin based on propylene, a resin based on urethane, and a resin of copolymer of those listed above, thereby making it possible to improve the fixing property to the recording medium, without requiring any complex configuration.

Next, explanation will be given about an ink-jet recording apparatus and an ink-jet recording method of the present disclosure. The ink-jet recording apparatus of the present disclosure is an ink-jet recording apparatus including: an ink storing section; and an ink discharging mechanism, and configured to discharge an ink stored in the ink storing section by the ink discharge mechanism; characterized in that the water-based ink for ink-jet recording of the present disclosure is stored in the ink storing section. As will be described later on, the ink-jet recording apparatus of the present disclosure may further include a drying mechanism configured to dry a recorded part recorded with the above-described ink.

The ink-jet recording method of the present disclosure includes: a recording step of performing recording on a recording medium by discharging, to the recording medium, a water-based ink by an ink-jet system; and a fixing step of using a drying mechanism configured to dry a recorded part of the recording medium so as to thereby fix the water-based ink to the recording medium, characterized in that in the recording step, the ink-jet recording method uses, as the water-based ink, the water-based ink for ink-jet recording of the present disclosure.

In the ink-jet recording method of the present disclosure, the recording medium is exemplified, for example, by coated paper (coated paper sheet), etc. In the present disclosure, the term "coated paper" means high quality printing paper, medium quality printing paper, etc., which is plain paper having a pulp as a constituent element thereof and having a coating agent applied thereon for a purpose of improving the smoothness, whiteness, glossiness, etc.; specifically, the coated paper is exemplified by high quality coated paper, medium quality coated paper, etc. Although the water-based ink and the ink-jet recording method of the present disclosure are suitably usable for ink-jet recording on the coated paper, the water-based ink and the ink-jet recording method of the present disclosure are not limited to the recording on the coated paper; it is possible to use the water-based ink and the ink-jet recording method of the present disclosure for ink-jet recording with respect to a recording medium which is different from the coated paper and which includes, for example, plain paper, glossy paper, mat paper, synthetic paper, cardboard (paperboard), corrugated cardboard, film, etc.

The ink-jet recording method of the present disclosure can be carried out, for example, by using the ink-jet recording apparatus of the present disclosure. The recording includes printing a letter (text), printing an image, printing, etc.

FIG. 1 is a schematic view of the configuration of an example of the ink-jet recording apparatus of the present disclosure. As depicted in FIG. 1, an ink-jet recording apparatus 100 includes a paper feed tray 101, a conveying mechanism such as a roller, etc. (not depicted in the drawings), recording mechanisms 102A and 102B, a platen 103, a drying mechanism 104, a paper discharge tray 105 and an ink storing section such as an ink cartridge or an ink tank, etc., (not depicted in the drawings). The paper feed tray 101 is capable of supporting a plurality of pieces of a recording medium (for example, coated paper) P which are stacked.

The recording mechanisms include a carriage 102A and an ink-jet head (ink discharging mechanism) 102B. The carriage 102A is supported by two guide rails (not depicted in the drawings) which are provided to extend perpendicularly to a conveying direction in which the recording medium P is conveyed. The two guide rails are supported by a casing (not depicted in the drawings) of the ink-jet recording apparatus 100. The carriage 102A is connected to a publicly known belt mechanism (not depicted in the drawings) provided on the two guide rails. The belt mechanism is driven by a carriage motor (not depicted in the drawings). The carriage 102A connected to the belt mechanism moves reciprocally in a direction perpendicular to the conveying direction of the recording medium P, by driving of the carriage motor.

Further, four ink tubes (not depicted in the drawings) connecting the ink storing section and the ink-jet head 102B and a flexible flat cable (not depicted in the drawings) electrically connecting the ink-jet head 102B and a control substrate (not depicted in the drawings) are provided to extend from the carriage 102A. The four ink tubes supply four color water-based inks which are yellow, magenta, cyan and black inks and which are stored in the ink storing section to the ink-jet head 102B. At least one of the four color water-based inks is the water-based ink of the present disclosure. The flexible flat cable transmits a control signal outputted form the control substrate to the ink-jet head 102B.

As depicted in FIG. 1, the ink-jet head 102B is mounted on the carriage 102A. A plurality of nozzles 102C are formed in a lower surface of the ink-jet head 102B. Forward ends of the plurality of nozzles 102C are exposed from the carriage 102A and the lower surface of the ink-jet head 102B. The ink-jet head 102B has an actuator (not depicted in the drawings) configured to apply a force for discharging or ejecting the water-based ink(s) supplied from the ink storing section to the ink-jet head 102B via the ink tube(s). The actuator may be of any system including the piezoelectric element system, the thermal ink system, the electrostatic attraction system, etc. In a process in which the carriage 102A moves reciprocally in the direction perpendicular to the conveying direction of the recording medium P, the ink-jet head 102B discharges or ejects the water-based ink(s) as fine ink droplets from the plurality of nozzles 102C onto the recording medium P. With this, an image is recorded on the recording medium P. The plate 103 is arranged to face or to be opposite to the recording mechanism, and supports the recording medium P which is conveyed from the paper feed tray 101.

The drying mechanism 104 dries the recorded part of the recording medium P. The temperature at the time of drying can be appropriately adjusted by changing the setting of the drying mechanism 104; specifically, the temperature is, for example, in a range of 20° C. to 200° C. or in a range of 40° C. to 120° C. Further, the time of the drying (drying time) can also be appropriately adjusted by changing the setting of the drying mechanism 104; the drying time, for example, exceeds 0 seconds and is not more than 300 seconds, is in a range of 0.05 second to 60 seconds, or is in a range of 0.1 second to 60 seconds. The water-based ink of the present disclosure is capable of improving the fixing property to the recording medium P, without requiring any complex configuration. The drying mechanism 104 may be any mechanism provided that the mechanism is capable of drying the recorded part. The drying mechanism 104 is exemplified, for example, by commercially available dryer, infrared heater, oven, belt conveyor oven, iron, hot press, etc.; the drying mechanism 104 is preferably a non-contact type drying mechanism, which is configured to dry the recorded part without making contact with the recorded part of the recording medium P, such as the dryer, infrared heater, oven, belt-conveying oven, etc.

The recording medium P for which the recording and the drying have been performed is conveyed to the paper discharge tray 105. According to the present disclosure, it is possible to improve the fixing property of the water-based ink for ink-jet recording with respect to the recording medium P, without requiring any complex configuration.

Next, an evaluating method of evaluating a water-based ink for ink-jet recording of the present disclosure will be explained. The evaluating method of the present disclosure is a method of evaluating a water-based ink for ink-jet recording, characterized in that the method determines that the fixing property to the recording medium can be improved in a case that the condition (A) and the condition (B) as described above are satisfied.

Next, a method of producing a water-based ink for ink-jet recording of the present disclosure will be explained. The method of producing the water-based ink for ink-jet recording of the present disclosure is a method of producing a water-based ink for ink jet recording, the method including: a preparing step of preparing the water-based ink; and an evaluating step of evaluating the water-based ink, characterized in that the evaluating step is practiced by the evaluating method of the present disclosure. The other conditions in the evaluating method and the producing method of the present disclosure are same as those in the water-based ink of the present disclosure.

EXAMPLES

Next, Examples of the present disclosure are explained together with Comparative Examples. Note that the present disclosure is not limited to or restricted by Examples and Comparative Examples described below.

<Preparation of Pigment Dispersion Liquid A>

Pure water (purified water) was added to 20% by mass of a pigment (carbon black) and 7% by mass of sodium hydroxide-neutralized product of styrene-acrylic acid copolymer (acid value: 175 mgKOH/g, molecular weight: 10000) so that the entire amount thereof was 100% by mass, followed by being agitated and mixed, and thus a mixture was obtained. The obtained mixture was placed in a wet sand mill charged with zirconia beads of which diameter was 0.3 mm, and was subjected to a dispersing process for 6 (six) hours. Afterwards, the zirconia beads were removed by a separator, and the mixture was filtrated through a cellulose acetate filter (pore size 3.0 μm). Thus, pigment dispersion liquid A was obtained. Note that the styrene-acrylic acid copolymer is a water-soluble polymer which is generally used as a dispersant for pigment (pigment dispersant).

Examples 1 to 11 and Comparative Examples 1 to 8

Components, which were included in Water-based Ink Composition (TABLE 1 and TABLE 2) and which were different from the pigment dispersion liquid A or CAB-O-JET (trade name) 300, were mixed uniformly or homogeneously; and thus an ink solvent was obtained. Subsequently, the obtained ink solvent was added to the pigment dispersion liquid A or CAB-O-JET (trade name) 300 dispersed in water, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus a water-based ink for ink jet recording of each of Examples 1 to 11 and Comparative Examples 1 to 8 indicated in TABLE 1 and TABLE 2 was obtained.

With respect to the water-based inks of Examples 1 to 11 and Comparative Examples 1 to 8, respectively, Evaluation of the fixing property to coated paper was performed by the following methods.

<Evaluation of the Fixing Property to Coated Paper>

An ink-jet printer MFC-J4225N produced by BROTHER INDUSTRIES., LTD., was used so as to form an image of a single color patch on coated paper ("OK TOP COAT+ (trade name)" produced by OJI PAPER CO., LTD.), by using each of the water-based inks of Examples and Comparative Examples, thereby producing an evaluation sample. Then, the evaluation sample was dried under a condition of 100° C. and 60 seconds. Then, a surface of the evaluation sample was rubbed by using a cotton swab from a recorded part of the water-based ink toward a non-recorded part (blank part, blank sheet part). The extent (state) of rubbing and dirtiness in each of the recorded part and the non-recorded part (blank sheet part) was confirmed by a visual inspection, and the evaluation was performed therefor in accordance with the following criterion for evaluation.

<Criterion for Evaluation of Fixing Property to Coated Paper>

AA: Any rubbing was not present in the recorded part, and any dirtied portion (smudge) was not present in the non-recorded part (blank sheet part).

A: Although a trace of rubbing was present in a location, in the recorded part, at which the rubbing was performed, any dirtied portion (smudge) was not present in the non-recorded part (blank sheet part).

B: A trace of rubbing was present in a location, in the recorded part, at which the rubbing was performed, and a dirtied portion (smudge) was present in the non-recorded part (blank sheet part).

C: The ink was removed at a part, of the recorded part, at which the rubbing was performed and was transferred to the non-recorded part (blank sheet part), and thus a dirtied portion (smudge) was present in the non-recorded part (blank sheet part).

The water-based ink composition and the result of evaluation of each of the water-based inks of Examples 1 to 11 and Comparative Examples 1 to 8 are indicated in TABLE 1 and TABLE 2.

TABLE 1

| | | | | EXAMPLES | | | | | |
|---|---|---|---|---|---|---|---|---|---|
| | | | | 1 | 2 | 3 | 4 | 5 | 6 |
| Water-based Ink Composition (% by weight) | Colorant (P) | Pigment dispersion liquid A (*1) | | 5.00 | 5.00 | 5.00 | 5.00 | 5.00 | 5.00 |
| | Resin fine particles (R) | | Tg (° C.) | | | | | | |
| | | MOWINYL (trade name) 6969D (*2) | 71 | 5.00 | 7.00 | — | — | — | 5.00 |
| | | MOWINYL (trade name) 5450 (*3) | 53 | — | — | 5.00 | — | — | — |
| | | MOWINYL (trade name) DM772 (*4) | 22 | — | — | — | 5.00 | — | — |
| | | SUPERFLEX (trade name) 150 (*5) | 40 | — | — | — | — | 5.00 | — |
| | Humectant (H) | | Vapor Pressure | | | | | | |
| | | Propylene glycol | 0.11 | 23.40 | 20.00 | 24.00 | 21.00 | 20.00 | — |
| | | Diethylene glycol | 0.03 | — | — | — | — | — | 23.40 |
| | Penetrant | Triethylene glycol-n-butyl ether | | 3.00 | 3.00 | 3.00 | 3.00 | 3.00 | 3.00 |
| | Surfactant | OLFIN (trade name) E1004 (*6) | | 1.00 | 1.00 | 1.00 | 1.00 | 1.00 | 1.00 |
| | | Water (W) | | 62.60 | 64.00 | 62.00 | 65.00 | 66.00 | 62.60 |
| | | P/R | | 1.0 | 0.7 | 1.0 | 1.0 | 1.0 | 1.0 |
| | | H/R | | 4.7 | 2.9 | 4.8 | 4.2 | 4.0 | 4.7 |
| | Initial viscosity (25° C.) (α mPa · s) | | | 6.3 | 6.2 | 5.9 | 5.8 | 6.0 | 5.4 |
| Viscosity after evaporation | | At the time when the evaporation rate was 50% (β mPa · s) | | 90 | 111 | 68 | 68 | 67 | 100 |
| | | At the time when the evaporation rate was 40% (γ mPa · s) | | 36 | 37 | 28 | 28 | 27 | 29 |
| | | β/α | | 14.4 | 17.8 | 11.5 | 11.7 | 11.1 | 18.6 |
| | | β/γ | | 2.5 | 3.0 | 2.5 | 2.4 | 2.5 | 3.4 |
| | Fixing property with respect to coated paper | | | AA | AA | AA | B | AA | B |

| | | | | EXAMPLES | | | | |
|---|---|---|---|---|---|---|---|---|
| | | | | 7 | 8 | 9 | 10 | 11 |
| Water-based Ink Composition (% by weight) | Colorant (P) | Pigment dispersion liquid A (*1) | | 5.00 | 5.00 | 5.00 | 5.00 | 5.00 |
| | Resin fine particles (R) | | Tg (° C.) | | | | | |
| | | MOWINYL (trade name) 6969D (*2) | 71 | 5.00 | 5.00 | 5.00 | 5.00 | 5.00 |
| | | MOWINYL (trade name) 5450 (*3) | 53 | — | — | — | — | — |
| | | MOWINYL (trade name) DM772 (*4) | 22 | — | — | — | — | — |
| | | SUPERFLEX (trade name) 150 (*5) | 40 | — | — | — | — | — |

TABLE 1-continued

| | | | Humectant (H) | Vapor Pressure | | | | | |
|---|---|---|---|---|---|---|---|---|---|
| | | | Propylene glycol | 0.11 | 36.00 | 30.00 | 13.50 | 10.00 | 7.50 |
| | | | Diethylene glycol | 0.03 | — | — | — | — | — |
| | Penetrant | | Triethylene glycol-n-butyl ether | | 3.00 | 3.00 | 3.00 | 3.00 | 3.00 |
| | Surfactant | | OLFIN (trade name) E1004 (*6) | | 1.00 | 1.00 | 1.00 | 1.00 | 1.00 |
| | | | Water (W) | | 50.00 | 56.00 | 72.50 | 76.00 | 78.50 |
| | | | P/R | | 1.0 | 1.0 | 1.0 | 1.0 | 1.0 |
| | | | H/R | | 7.2 | 6.0 | 2.7 | 2.0 | 1.5 |
| | | Initial viscosity (25° C.) ($\alpha$ mPa · s) | | | 10.1 | 7.9 | 4.2 | 3.6 | 3.3 |
| Viscosity after evaporation | | At the time when the evaporation rate was 50% ($\beta$ mPa · s) | | | 185 | 132 | 55 | 33 | 29 |
| | | At the time when the evaporation rate was 40% ($\gamma$ mPa · s) | | | 76 | 49 | 19 | 13 | 11 |
| | | | $\beta/\alpha$ | | 18.4 | 16.7 | 13.0 | 9.0 | 8.8 |
| | | | $\beta/\gamma$ | | 2.4 | 2.7 | 2.9 | 2.5 | 2.6 |
| | | Fixing property with respect to coated paper | | | B | AA | A | A | A |

LEGEND
*1: Dispersion liquid of carbon black (containing a resin dispersant); numeral in the table indicates pigment solid component amount.
*2: Manufactured by JAPAN COATING RESIN CO., LTD.; numeral in the table indicates effective ingredient amount (solid component amount).
*3: Manufactured by JAPAN COATING RESIN CO., LTD.; numeral in the table indicates effective ingredient amount (solid component amount).
*4: Manufactured by JAPAN COATING RESIN CO., LTD.; numeral in the table indicates effective ingredient amount (solid component amount).
*5: Manufactured by DAI-ICHI KOGYO SEIYAKU CO., LTD; numeral in the table indicates effective ingredient amount (solid component amount).
*6: Manufactured by NISSHIN KAGAKU KOGYO KK; numeral in the table indicates effective ingredient amount.

TABLE 2

| | | | | COMPARATIVE EXAMPLES | | | |
|---|---|---|---|---|---|---|---|
| | | | | 1 | 2 | 3 | 4 |
| Water-based Ink Composition (% by weight) | Colorant (P) | Pigment dispersion liquid A (*1) | | 5.00 | 5.00 | — | 5.00 |
| | | CAB-O-JET (trade name) 300 (*7) | | — | — | 5.00 | — |
| | Resin fine particles (R) | | Tg (° C.) | | | | |
| | | MOWINYL (trade name) 6969D (*2) | 71 | 5.00 | 5.00 | 5.00 | 3.00 |
| | | SUPERFLEX (trade name) 150 (*5) | 40 | — | — | — | — |
| | | SUPERFLEX (trade name) 500M (*8) | −39 | — | — | — | — |
| | Humectant (H) | | Vapor Pressure | | | | |
| | | Propylene glycol | 0.11 | — | 4.00 | 23.40 | 27.00 |
| | | Glycerol | <0.01 | — | — | — | — |
| | | Polyethylene glycol #200 | <0.01 | — | — | — | — |
| | Penetrant | Triethylene glycol-n-butyl ether | | 3.00 | 3.00 | 3.00 | 3.00 |
| | Surfactant | OLFIN (trade name) E1004 (*6) | | 1.00 | 1.00 | 1.00 | 1.00 |
| | | Water (W) | | 86.00 | 82.00 | 62.60 | 61.00 |
| | | P/R | | 1.0 | 1.0 | 1.0 | 1.7 |
| | | H/R | | 0 | 0.8 | 4.7 | 9.0 |
| | | Initial viscosity (25° C.) ($\alpha$ mPa · s) | | 2.5 | 2.8 | 6.2 | 6.1 |
| Viscosity after evaporation | | At the time when the evaporation rate was 50% ($\beta$ mPa · s) | | 15 | 23 | 724 | 64 |
| | | At the time when the evaporation rate was 40% ($\gamma$ mPa · s) | | 7 | 8 | 151 | 28 |
| | | $\beta/\alpha$ | | 6.0 | 8.2 | 117.7 | 10.4 |
| | | $\beta/\gamma$ | | 2.1 | 2.9 | 4.8 | 2.3 |
| | | Fixing property with respect to coated paper | | C | C | C | C |

| | | | | COMPARATIVE EXAMPLES | | | |
|---|---|---|---|---|---|---|---|
| | | | | 5 | 6 | 7 | 8 |
| Water-based Ink Composition (% by weight) | Colorant (P) | Pigment dispersion liquid A (*1) | | 5.00 | 5.00 | 5.00 | 5.00 |
| | | CAB-O-JET (trade name) 300 (*7) | | — | — | — | — |
| | Resin fine particles (R) | | Tg (° C.) | | | | |
| | | MOWINYL (trade name) 6969D (*2) | 71 | — | — | 5.00 | 5.00 |
| | | SUPERFLEX (trade name) 150 (*5) | 40 | 3.00 | — | — | — |
| | | SUPERFLEX (trade name) 500M (*8) | −39 | — | 5.00 | — | — |
| | Humectant (H) | | Vapor Pressure | | | | |
| | | Propylene glycol | 0.11 | 24.00 | 18.00 | — | — |
| | | Glycerol | <0.01 | — | — | 25.80 | — |
| | | Polyethylene glycol #200 | <0.01 | — | — | — | 23.40 |
| | Penetrant | Triethylene glycol-n-butyl ether | | 3.00 | 3.00 | 3.00 | 3.00 |
| | Surfactant | OLFIN (trade name) E1004 (*6) | | 1.00 | 1.00 | 1.00 | 1.00 |
| | | Water (W) | | 64.00 | 68.00 | 60.20 | 62.60 |
| | | P/R | | 1.7 | 1.0 | 1.0 | 1.0 |
| | | H/R | | 8.0 | 3.6 | 6.0 | 4.7 |
| | | Initial viscosity (25° C.) ($\alpha$ mPa · s) | | 6.1 | 5.9 | 6.4 | 6.5 |

TABLE 2-continued

| | | | | | |
|---|---|---|---|---|---|
| Viscosity after evaporation | At the time when the evaporation rate was 50% (β mPa·s) | 66 | 62 | 800 | 183 |
| | At the time when the evaporation rate was 40% (γ mPa·s) | 30 | 25 | 88 | 51 |
| | β/α | 10.9 | 10.5 | 125.2 | 28.2 |
| | β/γ | 2.2 | 2.5 | 9.1 | 3.6 |
| Fixing property with respect to coated paper | | C | C | C | C |

LEGEND
*1: Dispersion liquid of carbon black (containing a resin dispersant); numeral in the table indicates pigment solid component amount.
*7: Self-dispersible pigment; produced by CABOT CORPORATION; numeral in the table indicates pigment solid component amount.
*2: Manufactured by JAPAN COATING RESIN CO., LTD.; numeral in the table indicates effective ingredient amount (solid component amount).
*5: Manufactured by DAI-ICHI KOGYO SEIYAKU CO., LTD; numeral in the table indicates effective ingredient amount (solid component amount).
*8: Manufactured by DAI-ICHI KOGYO SEIYAKU CO., LTD; numeral in the table indicates effective ingredient amount (solid component amount).
*6: Manufactured by NISSHIN KAGAKU KOGYO KK; numeral in the table indicates effective ingredient amount.

As indicated in TABLE 1, in Examples 1 to 11, the result of evaluation of fixing property to the coated paper was satisfactory.

Example 1, of which conditions were similar to that of Example 6, except for using the propylene glycol as the specific humectant had further satisfactory result in the evaluation of the fixing property to the coated paper, as compared with Example 6. Further, Examples 1 and 3 to 5 of which conditions were similar to one another except for the difference in the kind of the resin fine particles will be compared to one another. In Examples 1, 3 and 5 each of which used the resin fine particles of which Tg was not less than 40° C. had further satisfactory result in the evaluation of the fixing property to the coated paper than that in Example 4 which used the resin fine particles of which Tg was less than 40° C.

Further, Example 1 in which β/α=14.4 was held and satisfied the condition (A1) had further satisfactory result in the evaluation of the fixing property to the coated paper, as compared with Example 7 of which condition was similar to that of Example 1 except that in Example 7 the content amount of the propylene glycol (the specific humectant) was great, β/α=18.4 was held and did not satisfy the condition (A1). Furthermore, Example 1 in which H/R≥2.9 was satisfied had further satisfactory result in the evaluation of the fixing property to the coated paper, as compared with Examples 9 to 11 of which conditions were similar to that of Example 1 except that in each of Examples 9 to 11 the content amount of the propylene glycol (the specific humectant) was small and H/R≥2.9 was not satisfied.

On the other hand, Comparative Example 1 which did not use the specific humectant had a unsatisfactory result in the evaluation of the fixing property to the coated paper. Further, Comparative Example 2 in which the content amount of the propylene glycol (the specific humectant) was small and did not satisfy the condition (A) also had a unsatisfactory result in the evaluation of the fixing property to the coated paper. Furthermore, Comparative Example 3 which used the self-dispersible pigment, instead of using the resin-dispersed pigment, also had a unsatisfactory result in the evaluation of the fixing property to the coated paper. Moreover, Comparative Example 4 in which the content amount of the resin fine particles was small and did not satisfy the condition (B) also had a unsatisfactory result in the evaluation of the fixing property to the coated paper. Further, Comparative Example 5 which did not satisfy the condition (B) also had a unsatisfactory result in the evaluation of the fixing property to the coated paper. Furthermore, Comparative Example 6 which used the resin fine particles of which the Tg was less than 22° C. also had a unsatisfactory result in the evaluation of the fixing property to the coated paper. Moreover, Comparative Examples 7 and 8 each of which used the humectant of which vapor pressure at 20° C. was less than 0.01 hPa, instead of using the specific humectant, also had a unsatisfactory result in the evaluation of the fixing property to the coated paper.

As described above, the water-based ink of the present disclosure has the excellent fixing property to the recording medium. The water-based ink of the present disclosure is widely applicable to the ink-jet recording with respect to various kinds of recording media, such as plain paper, glossy paper, mat paper, etc., in addition to the ink-jet recording with respect to the coated paper.

What is claimed is:

1. A water-based ink for ink-jet recording comprising:
   a resin-dispersed pigment;
   resin fine particles;
   a humectant including a humectant component of which vapor pressure at 20° C. is not less than 0.02 hPa; and
   water,
   wherein the resin fine particles are formed of a resin which is at least one selected from the group consisting of: a resin based on acrylic acid, a resin based on maleate ester, a resin based on vinyl acetate, a resin based on carbonate, a resin based on styrene, a resin based on ethylene, a resin based on propylene, a resin based on urethane, and a resin of copolymer of those listed above;
   the water-based ink satisfies the following conditions (A) and (B):

$$11.1 \leq \beta/\alpha \leq 17.8 \quad \text{condition (A):}$$

$$2.5 \leq \beta/\gamma \leq 3.0 \quad \text{condition (B):}$$

in the conditions (A) and (B),
   α: a viscosity (mPa·s) at 25° C. of the water-based ink in a case that an evaporation rate, of the water-based ink, obtained by the following formula (1) is 0%,
   β: a viscosity (mPa·s) at 25° C. of the water-based ink in a case that the evaporation rate, of the water-based ink, obtained by the following formula (1) is 50%, and
   γ: a viscosity (mPa·s) at 25° C. of the water-based ink in a case that the evaporation rate, of the water-based ink, obtained by the following formula (1) is 40%;

Evaporation rate(%)={(a mass of the water-based ink before evaporation)−(a mass of the water-based ink after the evaporation)}/(the mass of the water-based ink before the evaporation)×100    (1);

wherein a ratio (H/R) of a content amount (H) of the humectant to a content amount (R) of the resin fine particles in an entire amount of the water-based ink is not less than 2.9 and not more than 6.0; and wherein a glass transition temperature of the resin fine particles is in a range of 40° C. to 71° C.

2. The water-based ink for ink-jet recording according to claim 1, wherein the humectant component of which vapor pressure at 20° C. is not less than 0.02 hPa is propylene glycol.

3. The water-based ink for ink-jet recording according to claim 1, further satisfying the following condition (X), condition (Y) and condition (Z):

$$3 \leq R \leq 10 \quad \text{condition (X):}$$

$$0.7 \leq P/R \leq 1 \quad \text{condition (Y):}$$

$$W \geq 50, \quad \text{condition (Z):}$$

in the conditions (X), (Y) and (Z),
P: a solid content amount (% by mass) of the resin-dispersed pigment in the entire amount of the water-based ink,
R: a content amount (% by mass) of the resin fine particles in the entire amount of the water-based ink, and
W: a content amount (% by mass) of the water in the entire amount of the water-based ink.

4. The water-based ink for ink-jet recording according to claim 1, wherein the viscosity $\alpha$ at 25° C. of the water-based ink in the case that the evaporation rate, of the water-based ink, obtained by the formula (1) is 0% is not more than 10.1 mPa·s.

5. The water-based ink for ink-jet recording according to claim 1, wherein the viscosity $\alpha$ at 25° C. of the water-based ink in the case that the evaporation rate, of the water-based ink, obtained by the formula (1) is 0% is not more than 7.9 mPa·s.

6. The water-based ink for ink-jet recording according to claim 1, wherein an average particle diameter of the resin fine particles is in a range of 30 nm to 200 nm.

7. The water-based ink for ink-jet recording according to claim 1, wherein the viscosity $\alpha$ at 25° C. of the water-based ink in the case that the evaporation rate, of the water-based ink, obtained by the formula (1) is 0% is not less than 5.9 and not more than 7.9 mPa·s.

* * * * *